(12) United States Patent
Zhao (10) Patent No.: US 6,731,430 B2
(45) Date of Patent: May 4, 2004

(54) LOW CROSSTALK FLAT BAND FILTER

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 0 days.

(21) Appl. No.: 09/876,484

(22) Filed: Jun. 7, 2001

(65) Prior Publication Data

US 2001/0050814 A1 Dec. 13, 2001

Related U.S. Application Data

(60) Provisional application No. 60/210,049, filed on Jun. 7, 2000.

(51) Int. Cl.[7] ............................................. G02B 5/30
(52) U.S. Cl. ....................... 359/497; 359/494; 359/495; 359/496; 359/498
(58) Field of Search ................................ 359/494, 495, 359/496, 497, 498

(56) References Cited

U.S. PATENT DOCUMENTS

| | | | | |
|---|---|---|---|---|
| 4,247,166 A | | 1/1981 | Yeh | 350/374 |
| 4,500,178 A | | 2/1985 | Yeh | 350/404 |
| 4,548,479 A | | 10/1985 | Yeh | 350/404 |
| 5,062,694 A | | 11/1991 | Blair | 359/498 |
| 5,471,340 A | | 11/1995 | Cheng et al. | 359/281 |
| 5,574,596 A | | 11/1996 | Cheng | 359/484 |
| 5,606,439 A | | 2/1997 | Wu | 349/117 |
| 5,682,446 A | | 10/1997 | Pan et al. | 385/11 |
| 5,694,233 A | * | 12/1997 | Wu et al. | 359/117 |
| 5,724,165 A | | 3/1998 | Wu | 359/117 |
| 5,818,981 A | | 10/1998 | Pan et al. | 385/11 |
| 5,867,291 A | | 2/1999 | Wu et al. | 359/124 |
| 5,978,116 A | | 11/1999 | Wu et al. | 359/124 |
| 6,005,697 A | | 12/1999 | Wu et al. | 359/117 |
| 6,049,427 A | | 4/2000 | Bettman | 359/484 |

OTHER PUBLICATIONS

Carl F. Buhrer; *Synthesis and tuning of high–order Solc–type birefringent filters,* Applied Optics, Apr. 20, 1994, vol. 33, No. 12, pp. 2249–2254.

Tatsuya Kimura, Masatoshi Saruwatari; *Temperature Compensation of Birefringent Optical Filters;* Proceeding Letters, Aug. 1971, pp. 1273–1274.

Carl F. Buhrer; *Four waveplate dual tuner for birefringent filters and multiplexers;* Applied Optics, Sep. 1, 1987, vol. 26, No. 17, pp. 3628–3632.

P. Melman, W. J. Carlsen, B. Foley; *Tunable Birefringent Wavelength–Division Multiplexer/Demultiplexer,* Electronics Letters, Jul. 18, 1985, vol. 21, No. 15, pp. 634 and 635.

Yohji Fujii; *Tunable wavelength multi/demultiplexer using a variable retardation phase plate;* Applied Optics, Aug. 20, 1990, vol. 29, No. 29.

(List continued on next page.)

Primary Examiner—Audrey Chang
Assistant Examiner—Craig Curtis
(74) Attorney, Agent, or Firm—Norman E. Carte (57) ABSTRACT

A filter for filtering electromagnetic radiation has two polarization selection elements and a birefringent element assembly disposed intermediate polarization selection elements. The birefringent element assembly is configured so as to optimize contributions of a fundamental and at least one odd harmonic of a transmission vs. wavelength curve in a manner which enhances transmission vs. wavelength curve stopband depth and passband flatness, so as to enhance performance and mitigate cross-talk.

10 Claims, 2 Drawing Sheets

OTHER PUBLICATIONS

S.E. Harris, E.O. Ammann, I. C. Chang; *Optical Network Synthesis Using Birefringent Crystals. * I. Synthesis of Lossless Networks of Equal–Length Crystals, Journal of the Optical Society of America*, Oct. 1964, vol. 564, No. 10, pp. 1267–1279.

Tatsuya Kimura, Masatoshi Saruwatari, and Kenju Otsuka; *Birefringent Branching Filters for Wideband Optical FDM Communications; Applied Optics*, Feb. 1973, vol. 12, No. 2, pp. 373 to 379.

Godfrey R. Hill; *Wavelength Domain Optical Network Techniques; Proceedings of the IEEE*, Jan. 1989, vol. 77, No. 1, pp. 121 to 132.

J. M. Senior, S.D. Cusworth; *Devices for Wavelength Multiplexing and Demultiplexing; IEE Proceedings*, Jun. 1989, vol. 136, Pt. J. No. 3, pp. 183–202.

* cited by examiner

LOW CROSSTALK FLAT BAND FILTER

CROSS-REFERENCE TO RELATED APPLICATIONS

This patent application claims the benefit of the filing date of U.S. Provisional Patent Application Ser. No. 60/210,049, filed on Jun. 7, 2000, and entitled Low Crosstalk Flat Band Filter, the entire contents of which are hereby expressly incorporated by reference.

This patent application is related to co-pending patent application Ser. No. 09/876,602, filed on Jun. 7, 2001 entitled BIREFRINGENT DEVICES (Docket No. 12569-02); co-pending patent application Ser. No. 09/876,368, filed on Jun. 7, 2001 entitled INTERLEAVER USING SPATIAL BIREFRINGENT ELEMENTS (Docket No. 12569-03); co-pending patent application Ser. No. 09/876,819, filed on Jun. 7, 2001 entitled COMB FILTER FOR DENSE WAVELENGTH DIVISION MULTIPLEXING (Docket No. 11); co-pending patent application Ser. No. 09/876,647, filed on Jun. 7, 2001 entitled APPARATUS AND METHOD FOR LOW DISPERSION IN COMMUNICATIONS (Docket No. 13); all filed on the instant date herewith and commonly owned by the Assignee of this patent application, the entire contents of all which are hereby expressly incorporated by reference.

FIELD OF THE INVENTION

The present invention relates generally to optical devices. The present invention relates more particularly to an apparatus and method for filtering electromagnetic radiation, such as optical communication signals used in dense wavelength-division multiplexing optical communication systems and the live.

BACKGROUND OF THE INVENTION

Optical communication systems which utilize wavelength-division multiplexing (WDM) and dense wavelength division multiplexing (DWDM) technologies are well known. According to both wavelength-division multiplexing and dense wavelength-division multiplexing, a plurality of different wavelengths of light, typically infrared light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information may be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed by an interleaver. A similar device facilitates multiplexing of the individual channels by a transmitter.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Typically, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to reduce communication speed in order to compensate for the effects of crosstalk. Moreover, it is generally desirable to reduce channel spacing so as to facilitate the communication of a greater number of channels.

Filters are typically used within interleavers (and are also used in various other optical devices), so as to facilitate the separation of channels from one another in a wavelength-division multiplexing or dense wavelength division multiplexing system. Various characteristics of such filters contribute to the mitigation of crosstalk and thus to contribute reliable communications. For example, the ability of a filter to separate one optical channel from another or one set of channels from another set of channels is dependent substantially upon width and depth of the filter's stopband. Generally, the wider and deeper the stopband, the more effectively the filter rejects unwanted adjacent channels and thus the more effectively the filter mitigates crosstalk.

Further, the flatness and width of the filter's passband is important. The flatness of the filter's passband determines how much the signal is undesirably altered during the filtering process. A substantially flat passband is desired, so as to assure that minimal undesirable alteration of the signal occurs. The width of the passband determines how far from the ideal or nominal channel center frequency a signal can be and still be effectively selected. A wide passband is desirable because the nominal center frequency of a carrier which is utilized to define a communication channel is not perfectly stable, and therefore tends to drift over time. Further, the nominal center frequency of a filter passband likewise tends to drift over time. Although it is possible to construct a system wherein the center frequency of the communication channel and the center frequency of the filter are comparatively stable, it is generally impractical and undesirably expensive to do so.

In order to construct a system wherein the center frequency of the communication channel and the center frequency of the filter are comparatively stable, it is necessary to provide precise control of the manufacturing processes involved. Since it is generally impractical and undesirably expensive to provide such precise control during manufacturing, the center frequency of communication channels and the center frequency of filters generally tend to mismatch with each other. Precise control of manufacturing processes is difficult because it involves the use of more stringent tolerances which inherently require more accurate manufacturing equipment and more time consuming procedures. The center frequency of the communication channel and the center frequency of the filter also tend to drift over time due to inevitable material and device degradation over time and also due to changes in the optical characteristics of optical components due to temperature changes. Therefore, it is important that the passband be wide enough so as to include a selected signal, even when both the carrier frequency of the selected signal and the center frequency of the passband are not precisely matched or aligned during manufacturing and have drifted substantially over time.

Birefringent filters for use in wavelength-division multiplexing and dense wavelength-division multiplexing communication systems are well known. Such birefringent filters are used to select or deselect optical signals according to the channel wavelengths thereof. However, contemporary birefringent filters tend to suffer from deficiencies caused by inherent carrier and passband instability due to manufacturing difficulties and due to drifting over time, as discussed above. That is, the passband of a contemporary birefringent filter is not as flat or as wide as is necessary for optimal performance. Further, the stopbands of such contemporary birefringent filters are not as deep or as wide as is necessary for optimal performance. Therefore, it is desirable to optimize such birefringent filters in a manner which enhances the width of the passband, makes the passband more flat, and which also widens and deepens the stopband. Further, it is desirable to provide a birefringent filter whereby the width of the stopband is roughly equal to the width of the passband, so as to facilitate the efficient separation of equally spaced channels in a wavelength-division multiplexing or dense wavelength-division multiplexing communication system.

Such birefringent filters typically comprise a plurality of birefringent elements placed end-to-end between two polarization selection devices, so as to define a contemporary Solc-type optical filter.

Figure 1:
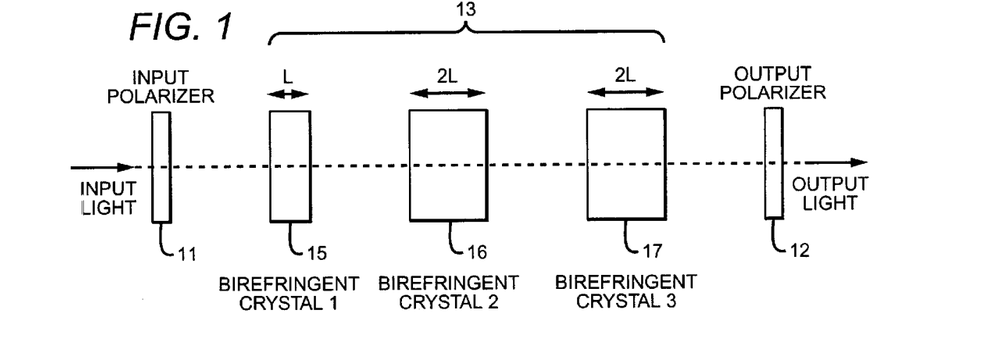
FIG. 1 is a schematic representation showing generally the relative positions of the input polarizing element, the birefringent element assembly (which comprises the first, second and third birefringent elements or crystals) and the output polarizing element, with respect to one another.

Referring now to FIG. 1, a typical layout of a Solc-type filter is shown. This layout is common to both contemporary Solc-type filters and the present invention. This filter comprises an input polarization selection device (e.g., polarizer) 11, an output polarization selection device 12, and a birefringent element assembly disposed generally intermediate the input polarization selection device 11 and the output polarization selection device 12. The polarization axis of the input polarization selection device 11 and the output polarization selection device 12 are typically parallel to one another.

According to contemporary practice, the birefringent element assembly 13 of such a Solc-type filter comprises three birefringent elements or crystals. A first birefringent crystal 15 has a length of L. A second birefringent crystal 16 has a length of 2L. A third birefringent crystal 17 has a length of 2L.

Further, according to contemporary practice the orientations of the fast axes of the birefringent crystals 15, 16 and 17 with respect to the polarization axis of the input polarizer 11 (and typically with respect to the polarization axis of the output polarization selection device 12, as well), are 45° for the first birefringent crystal 15, −15° for the second birefringent crystal 16, and 10° for the third birefringent crystal 17.

Although such contemporary Solc-type filters are generally suitable for some applications in optical communications, such contemporary Solc-type filters suffer from inherent deficiencies which detract from their overall effectiveness. Such contemporary Solc-type filters are birefringent filters which suffer from an insufficiently flat and undesirably narrow passband, as well as an insufficiently deep and undesirably narrow stopband, as discussed above.

Figure 2:
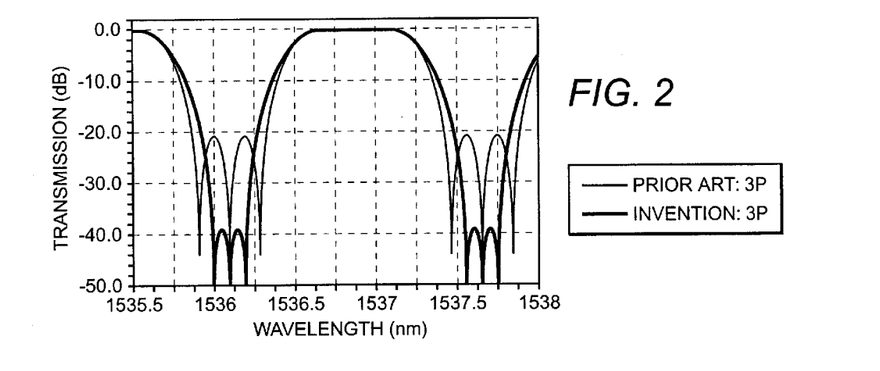
FIG. 2 is a transmission vs. wavelength chart showing a characteristic curve for a contemporary three element filter and also showing a characteristic curve for the three element filter of the present invention.
Figure 3:
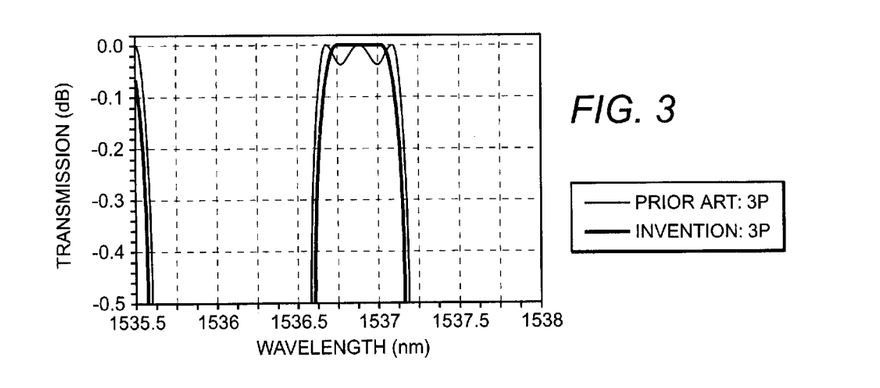
FIG. 3 is enlarged view of a passband of the contemporary and present invention response curves of FIG. 2.

Referring now to FIGS. 2 and 3, transmission vs. wavelength curves for both the present invention and contemporary filters are shown.

With particular reference to FIG. 2, the stopband of the contemporary filter has peaks which are 20 dB down from the 0 dB level of the passband. Thus, the illustrated contemporary Solc-type filter provides only approximately 20 dB of cutoff in the stopband thereof. Further, the contemporary filter has a comparatively narrow −30 dB stopband.

With particular reference to FIG. 3 (which shows the two curves of FIG. 2 with increased resolution), it can be seen that the passband of the contemporary Solc-type filter contains an undesirable amount of ripple, and therefore is not as flat as desirable. Thus, such a contemporary Solc-type filter undesirably alters a signal which is transmitted therethrough.

The comparatively large amount of ripple in the passband of the contemporary Solc-type filter, in combination with the insufficiently deep stopband thereof, substantially degrades the performance of the filter such that the contemporary Solc-type filter frequently cannot meet the desired performance requirement therefor. Such poor performance all too frequently facilitates undesirable crosstalk between adjacent channels in wavelength-division multiplexing and dense wavelength-division multiplexing communication systems, particularly in those systems wherein the carrier wavelengths and/or the passband/stopband positions of the filter are insufficiently stable and not well controlled.

In view of the foregoing, it is desirable to provide a filter which has a comparatively flat transmission vs. wavelength characteristic curve at that portion of the curve defining the passband and which also has a comparatively deep stopband, so as to substantially mitigate crosstalk and so as to enhance filter performance in wavelength-division multiplexing, dense wavelength-division multiplexing, and similar communication systems.

SUMMARY OF THE INVENTION

The present invention specifically addresses and alleviates the above-mentioned deficiencies associated with the prior art. More particularly, the present invention comprises a filter for filtering electromagnetic radiation, wherein the filter comprises two polarizing elements and a birefringent element assembly disposed generally intermediate the polarizing elements. The birefringent element assembly is preferably configured so as to optimize contributions of a fundamental and at least one odd harmonic of a transmission vs. wavelength curve in a manner which enhances transmission vs. wavelength curve flatness for a passband thereof. The birefringent element assembly is also preferably configured so as to optimize contributions of a fundamental and at least one odd harmonic of a transmission vs. wavelength curve in a manner which enhances the depth of the stopband thereof.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when considered with respect to the following detailed description, appended claims and accompanying drawings wherein:

DETAILED DESCRIPTION OF THE INVENTION

The detailed description set forth below in connection with the appended drawings is intended as a description of the presently preferred embodiments of the invention, and is not intended to represent the only forms in which the present invention may be constructed or utilized. The description sets forth the functions of the invention and the sequence of steps for constructing and operating the invention in connection with the illustrated embodiments. It is to be understood, however, that the same equivalent functions and sequences may be accomplished by different embodiments that are also intended to be encompassed within the spirit and scope of the invention.

Generally, the present invention comprises a filter for filtering electromagnetic radiation, wherein the filter comprises two polarization selection elements (such as polarizers) and a birefringent element assembly (such as an assembly of birefringent crystals) disposed intermediate the two polarization selection elements and configured so as to optimize contributions of a fundamental and at least one odd harmonic of a transmission vs. wavelength curve in a manner which enhances transmission vs. wavelength curve flatness for a passband thereof and also in a manner which makes the stopband thereof deeper.

It has been found that an element of a birefringent element assembly, such as an element comprised of a birefringent crystal, can be used to alter a contribution of a fundamental and a plurality of odd harmonics to a transmission vs. wavelength curve, wherein the alteration depends upon the parameters selected for the birefringent element. For example, a birefringent element may be selected so as to have a phase delay and a fast axis orientation (such as with respect to a polarization selection element) wherein the values of these parameters determine how much of a fundamental and a plurality of odd harmonics are present in the transmission vs. wavelength characteristic curve of a filter assembly. Changing these parameters tends to change the amount of the fundamental and the amount of each odd harmonic present in the transmission vs. wavelength curve. By carefully selecting the parameters for each birefringent element, a transmission vs. wavelength curve can be defined having desired characteristics, such as flatness of the passband, width of the passband, depth of the stopband, and width of the stopband.

Thus, the present invention comprises a filter for filtering electromagnetic radiation, wherein the filter comprises two polarization selection elements and a birefringent element assembly disposed intermediate the two polarization selection elements. The birefringent element assembly comprises a first birefringent element which provides an output transmission vs. wavelength curve which is approximately defined by a fundamental sine wave; a second birefringent element which cooperates with the first birefringent element to provide an output transmission vs. wavelength curve which is approximately defined by a fundamental sine wave plus a third harmonic of the fundamental sine wave; and a third birefringent element which cooperates with the first and second birefringent elements to provide an output vs. transmission curve which is approximately defined by a fundamental sine wave plus a third harmonic of the fundamental sine wave, plus a fifth harmonic of the fundamental sine wave. The parameters of the first, second and third birefringent elements are selected so as to enhance transmission vs. wavelength curve flatness for a filter passband and so as to deepen the stopband, by causing the fundamental sine wave and its third and fifth harmonics to sum in an advantageous manner.

According to the present invention, the birefringent elements preferably have parameters which are specifically selected so as to provide generally optimized curve flatness for the passband and so as to provide enhanced depth for the stopband, thus enhancing performance of the filter and also substantially mitigating undesirable cross-talk.

Those skilled in the art will appreciate that various different types of polarization selection elements and birefringent elements may be utilized in such a birefringent element assembly. Thus, various different types of birefringent elements are suitable for use in the present invention. Also, various different types of polarization selection elements may similarly be utilized.

Generally, such a birefringent element must provide paths having different optical path lengths for two orthogonally polarized (with respect to one another) optical signals. Thus, according to the present invention, a birefringent element is defined as any optical device suitable for providing different optical path lengths for generally orthogonal optical signals, so as to substantially mimic the effect provided by birefringent crystals.

Generally, such polarization selection elements must select or favor the transmission of light having one particular polarization direction and substantially reject, i.e., either absorb, reflect or deflect light having all other polarization directions. Thus, according to the present invention, a polarization selection element or polarizing element is defined as any optical device suitable for facilitating the transmission of light having one polarization direction, while substantially mitigating the transmission of light having other polarization directions.

Thus, a birefringent filter for filtering electromagnetic radiation may be provided according the present invention by disposing a birefringent element assembly between two polarization selection elements, wherein the birefringent element assembly provides an effect approximate to an effect provided by a first birefringent crystal providing a phase delay and having an angular orientation of a fast axis thereof of approximately 45° with respect to the polarization direction of the first polarization selection element, a second birefringent element providing a phase delay of approximately twice that of the first birefringent element and having an angular orientation of a fast axis thereof of approximately −21° with respect to the polarization axis of the same polarization selection element, and a third birefringent element providing a phase delay of approximately twice that of the first birefringent element and having an angular orientation of a fast axis thereof of approximately 7° with respect to the polarization axis of the same polarization selection element.

As defined herein, angular orientations are positive when they are clockwise as viewed looking into oncoming light and are negative when they are counterclockwise as viewed looking into oncoming light.

It is important to understand that, although the second polarization selection element will typically have a polarization direction which is parallel to the polarization direction of the first polarization selection element, the second polarization selection element may alternatively have a polarization direction which is orthogonal to the polarization direction of the first polarization selection element. Indeed, the second polarization selection element may have any desired angular orientation with respect to the first polarization selection. Varying the angular orientation of the second polarization selection element with respect to the first polarization selection element merely shifts the transmission vs. wavelength curve of the filter in frequency. Thus, a filter having passbands and stopbands at desired wavelengths may be constructed by orienting the polarization direction of the second polarization selection element with respect to the polarization direction of the first polarization selection element appropriately.

The filter of the present invention is suitable for use in an interleaver for separating channels from one another and/or for combining separate channels together in an optical communication system, such as a wavelength-division multiplexing system or a dense wavelength-division multiplexing system. That is, as those skilled in the art will appreciate, the filter of the present invention is suitable for use in both multiplexing and demultiplexing applications. Thus, the filter of the present invention may find application in such interleavers as those commonly used in optical communication system receivers and transmitters.

Referring again to FIG. 1, the general position of components according to the present invention is the same as according to the contemporary filter discussed above. The lengths of the birefringent crystals of the present invention are also the same as in contemporary Solc-type filters (i.e., L, 2L and 2L for the first 15, second 16, and third 17 birefringent crystals, respectively). However, the angular orientation of each birefringent element or crystal has been varied, so as to optimize the resulting transmission vs. wavelength curve in a manner which enhances performance and mitigates undesirable crosstalk.

According to one preferred embodiment of the present invention, the polarization axis of the input polarization selection element 11 and the output polarization selection element 12 are approximately parallel with respect to one another. Again, the polarization axis of the input polarization selection element 11 and the output polarization selection element 12 may alternatively be orthogonal to one another, or at any other desired angle with respect to one another so as to provide the desired transmission vs. wavelength curve. The fast axis of the first birefringent crystal 15 is oriented at an angle of between approximately 43° and approximately 47°, preferably approximately 45°, with respect to the polarization axis of the input polarization selection element 11. The fast axis of the second birefringent crystal 16 is oriented at an angle of between approximately −19° and approximately −23°, preferably approximately −21°, with respect to the polarization axis of the input polarization selection element 11. The fast axis of the third birefringent crystal 17 is oriented at an angle of between approximately 5° and approximately 9°, preferably approximately 7°, with respect to the polarization axis of the input polarization selection element 11.

It has been found that use of the above-listed angular orientations of the first 15, second 16, and third 17 birefringent crystals enhances the flatness of the passband of the filter, while simultaneously significantly deepening the stopband thereof. Thus, according to the present invention, performance is enhanced. The enhanced flatness of the passband and the deeper stopband cooperate to mitigate undesirable modification of the passed signal and to substantially mitigate undesirable cross-talk.

Referring again to FIGS. 2 and 3, it can be seen that the filter response curve of the present invention is substantially flatter (best shown in FIG. 3) than the response curve of the contemporary filter for the passband thereof. More importantly, it can be seen that the stopband according to the present invention is approximately −40 dB down with respect to the passband, whereas the stopband of the contemporary filter is only approximately −20 dB down with respect to the past band. Further, the stopband is substantially wider, e.g., such as at the −30 dB points, according to the present invention than according to the contemporary filter.

Those skilled in the art will appreciate that such filter characteristics of the present invention provide substantially enhanced channel separation, as compared to the channel separation provided by a contemporary filter. Therefore, undesirable crosstalk will be substantially mitigated when utilizing the filter of the present invention. The present invention's birefringent element orientations of approximately 45° (first crystal 15), approximately −21° (second crystal 16), and approximately 7° (third crystal 17) provide enhanced performance as compared to the contemporary filter birefringent element orientations of 45° (first crystal 15), −15° (second crystal 16) and 10° (third crystal 17).

It has been found that the filter of the present invention provides crosstalk of less than −25 dB and can be as low as −38 dB over the flat passband, while having a ripple (and consequently loss) of less than 0.001 dB.

The first 15 and third 17 birefringent crystals may optionally be swapped with one another without altering the performance of the improved filter of the present invention. The angular orientation of the first 15 and third 17 birefringent crystals remain the same after swapping. Thus, the third birefringent crystal 17 may be located next to the input polarization selection element (while keeping its angular orientation of approximately 7°), while the first birefringent crystal 15 may be located next to the output polarization selection element 12 (while keeping its angular orientation of approximately 45°), without altering the performance of the filter. This flexibility in arranging the birefringent elements provides convenience in system assembly, particularly when birefringent techniques other than birefringent crystals are utilized.

It is important to appreciate that, although the improved filter of the present invention has been described herein as utilizing birefringent crystals, other birefringent elements may be utilized to achieve similar effects. For example, polarization beam splitters (PBSs) or polarization beam displacers (PBDs) may be utilized as the polarization selection elements to separate the incoming optical signal into two orthogonally polarized optical beams and to cause the two beams to travel over different optical paths before being recombined. In this manner, the optically path length of each birefringent element may be varied for each polarization.

When birefringent elements other than birefringent crystals are utilized, then the angular orientations thereof necessary to provide the transmission vs. wavelength characteristic curve enhancement of the present invention can be converted into relative angles between the optical beam polarization direction and the equivalent fast axes of such devices.

Polarization selection elements other than polarizers may be utilized to effect desired polarization of the signal prior to encountering the birefringent element assembly and upon exiting the birefringent element assembly. For example, polarization beam splitters, (PBSs) or polarization beam displacers (PBDs) may be utilized to effect the desired polarization of the optical signals which are input to and output from the birefringent element assembly. Those skilled in the art will appreciate that various other optical devices are likewise suitable for facilitating such polarization selection functionality.

Further, angles other than 45°, −21° and 7° may be utilized for the first-15, second-16, and third-17 crystals, respectively. That is, other sets of angles can give the same filter passband/stopband performance. If ($\phi_1$, $\phi_2$, $\phi_3$ are the crystal orientations for crystals or other equivalent birefringent elements 1, 2 and 3, respectively, the same passband/stopband performance can be obtained at corresponding crystal orientations at $90°-_{\phi1}$, $90°-_{\phi2}$, $90°-_{1\phi3}$ and $90°+_{\phi1}$, $90°+_{\phi2}$, $90°+_{\phi3}$ respectively. Examples of such angle sets are (45°, 111° (−69°), 83°) and (135°, 69°, 97°) for the case of (45°, −21°, 7°) and (45°, 105° (−75°), 80°) and (135°, 75°, 100°) for the case of (45, −15°, 10°). It is clear that other angles that are incremental of +/−180° with respect to any one of these corresponding angles are possible solutions too.

The crystal orientation angles recited herein are defined as the angle between the fast axis of the birefringent device or crystal and the input light polarization direction of the light which has passed through the input polarization selection device or input polarizer 11. The sign convention for such angles is such that an angle is positive when resulting from clockwise rotation when facing the oncoming light and an angle is negative resulting from counterclockwise rotation when facing the oncoming light is negative. This convention is standard for the description of orientation angles in Solc-type filters.

Further, according to the present invention, the phase delay of the first 15, second 16, and third 17 birefringent elements is provided by the relationship: $2\Gamma_1=\Gamma_2=\Gamma_3$, where $\Gamma_1$, $\Gamma_2$, $\Gamma_3$ are the phase delays for the first birefringent element 15, second birefringent element 16, and the third birefringent element 17, respectively.

The input polarization selection element 11 and the output polarization selection device 12 need not be parallel with respect to one another, but rather may have any other desired orientation. Generally, changing the orientation of the polarization axis of the output polarization selection device 12 with respect to the polarization axis of the input polarization selection element 11 results in a frequency shift (left or right movement of the transmission vs. wavelength curve) in the filter response.

Figure 4:
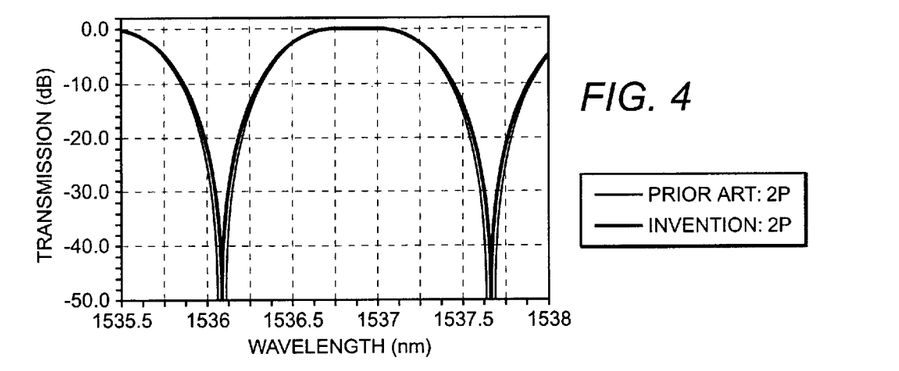
FIG. 4 is a transmission vs. wavelength chart showing a characteristic curve for a contemporary two element filter and also showing a characteristic curve for the two element filter of the present invention.
Figure 5:
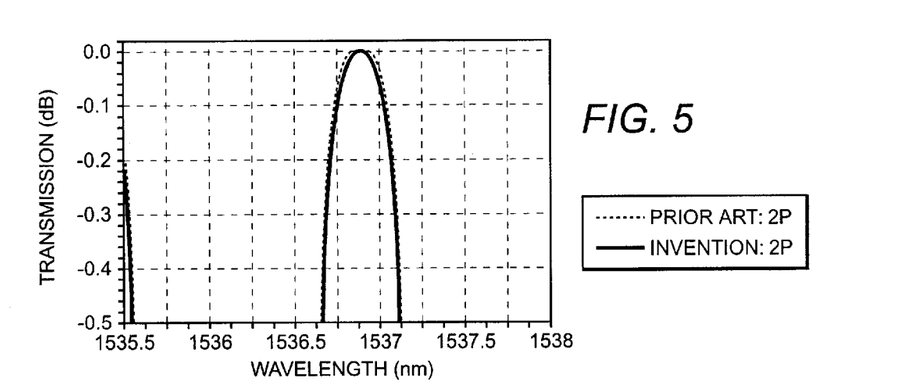
FIG. 5 is enlarged view of a passband of the contemporary and present invention response curves of FIG. 4.

Optionally, the third birefringent crystal 17 may be omitted. In this instance, the transmission vs. wavelength curves of FIGS. 4 and 5 result. The angular orientations of the first birefringent element 15 and second birefringent element 16 remain the same, i.e., 45° (first crystal 15) and −21° (second element 16). Although the performance utilizing only the first birefringent crystal 15 and the second birefringent element 16 is reduced when compared with the performance of the three element filter of the present invention, applications for such a low cost filter exist.

The orientation of the polarization direction of the output polarization selection element with respect to the polarization direction of the input polarization selection element can be any desired angle. Changing the angle between the polarization direction of the output polarization selection element with respect to the polarization direction of the input polarization selection element merely shifts the transmission vs. wavelength curve in wavelength. That is, changing this angle merely changes the positions of the passbands and stopbands, so as to facilitate the selection of different desired channels in a wavelength division multiplexing or dense wavelength division multiplexing communication system. Thus, any desired or predetermined angle between the polarization direction of the output polarization selection element and the input polarization selection element may be utilized.

When a sequence of birefringent elements or crystals is recited herein, such as a sequence denoted as first, second and third, that sequence may either be from the input polarization element or from the output polarization element. For example, the sequence of first birefringent element, second birefringent element and third birefringent element can either define a series of birefringent elements wherein the first birefringent element is closest to the input polarization element, the second birefringent element is next, and the third birefringent element is closest to the output polarization element, or can alternatively define such a series wherein the first birefringent element is closest to the output polarization element, the second birefringent element is next, and the third birefringent element is closest to the input polarization element. Thus, the sequence can run either from input polarization element to the output polarization element or vice versa. This is possible since reversing the first and third polarization elements in a birefringent element assembly does not affect the transmissions characteristics thereof.

It is understood that the exemplary low cross-talk flat band filters described herein and shown in the drawings represent only presently preferred embodiments of the invention. Indeed, various modifications and additions may be made to such embodiments without departing from the spirit and scope of the invention. For example, various means for separating an input signal into orthogonal signals which then are caused to follow different optical paths so as to achieve a birefringent effect are contemplated. Also, various means for polarizing signals provided to and emitted from the birefringent element assembly are known. Generally, any device which allows the selective transmission of light having a predetermined polarization direction (which does not substantially transmit light having other polarization directions) is suitable. Thus, these modifications and additions may be obvious to those skilled in the art and may be implemented adapt the present invention for use in a variety of different applications.

What is claimed is:

1. A filter for filtering electromagnetic radiation, the filter comprising:

an input polarization selection element having a polarization direction;

an output polarization selection element having a polarization direction;

a birefringent element assembly disposed intermediate the input polarization selection element, and the output polarization selection element, the birefringent element assembly comprising:

a first birefringent element providing a phase delay and the fast axis thereof having an effective angle of approximately 45° with respect to the polarization direction of the input polarization selection element;

a second birefringent element providing a birefringent phase delay of approximately twice that of the first birefringent element and the fast axis having an effective angle of approximately −21° with respect to the polarization direction of the input polarization selection element; and a third birefringent element providing a birefringent phase delay of approximately twice that of the first birefringent element and the fast axis having an effective angle of approximately 7° with respect to the polarization direction of the input polarization selection element.

2. The filter as recited in claim 1, wherein the input polarization selection element, the output polarization selection element, and the birefringent element assembly are configured to transmit infrared light.

3. The filter as recited in claim 1, wherein:
the first birefringent element comprises a first birefringent crystal and the effective angle of the first birefringent element is defined by an angular orientation of a fast axis of the first birefringent crystal with respect to the polarization direction of the input polarization selection element;
the second birefringent element comprises a second birefringent crystal and the effective angle of the second birefringent element is defined by an angular orientation of a fast axis of the second birefringent crystal with respect to the polarization direction of the input polarization selection element; and
the third birefringent element comprises a third birefringent crystal and the effective angle of the third birefringent element is defined by an angular orientation of a fast axis of the third birefringent crystal with respect to the polarization direction of the input polarization selection element.

4. The filter as recited in claim 1, wherein:
the input polarization selection element comprises a polarizer; and
the output polarization selection element comprises a polarizer.

5. The filter as recited in claim 1, wherein the polarization selection elements comprise polarization beam splitters.

6. The filter as recited in claim 1, wherein the polarization selection elements comprise a plurality of polarization beam displacers.

7. A filter for filtering electromagnetic radiation, the filter comprising:
an input polarization selection element having a polarization direction;
an output polarization selection element having a polarization direction;
a birefringent element assembly disposed intermediate the input polarization selection element, and the output polarization selection element, the birefringent element assembly comprising:
a first birefringent element providing a phase delay and the fast axis thereof having an effective angle of approximately 45° with respect to the polarization direction of the input polarization selection element;
a second birefringent element providing a birefringent phase delay of approximately twice that of the first birefringent element and the fast axis having an effective angle of approximately −69° with respect to the polarization direction of the input polarization selection element; and
a third birefringent element providing a birefringent phase delay of approximately twice that of the first birefringent element and the fast axis having an effective angle of approximately 83° with respect to the polarization direction of the input polarization selection element.

8. A filter for filtering electromagnetic radiation, the filter comprising:

an input polarization selection element having a polarization direction;
an output polarization selection element having a polarization direction;
a birefringent element assembly disposed intermediate the input polarization selection element, and the output polarization selection element, the birefringent element assembly comprising:
a first birefringent element providing a phase delay and the fast axis thereof having an effective angle of approximately 135° with respect to the polarization direction of the input polarization selection element;
a second birefringent element providing a birefringent phase delay of approximately twice that of the first birefringent element and the fast axis having an effective angle of approximately 69° with respect to the polarization direction of the input polarization selection element; and
a third birefringent element providing a birefringent phase delay of approximately twice that of the first birefringent element and the fast axis having an effective angle of approximately 97° with respect to the polarization direction of the input polarization selection element.

9. A filter for filtering electromagnetic radiation, the filter comprising:
an input polarization selection element;
an output polarization selection element;
a birefringent element assembly disposed intermediate the input polarization element and the output polarization element, the birefringent element assembly comprising one set of birefringent elements selected from the group of sets of birefringent elements consisting of:
a first set of birefringent elements comprising a first birefringent element having a phase delay of $\Gamma$ and having a fast axis thereof oriented at an angle of approximately 45° with respect to a polarization direction of the input polarization selection element, a second birefringent element having a phase delay of approximately $2\Gamma$ and having a fast axis thereof oriented at an angle of approximately −21° with respect to the polarization direction of the input polarization selection element and a third birefringent element having a phase delay of approximately $2\Gamma$ and having a fast axis thereof oriented at an angle of approximately 7° with respect to the polarization direction of the input polarization selection element;
a second set of birefringent elements comprising a first birefringent element having a phase delay of $\Gamma$ and having a fast axis thereof oriented at an angle of approximately 45° with respect to the polarization direction of the input polarization selection element, a second birefringent element having a phase delay of approximately $2\Gamma$ and having a fast axis thereof oriented at an angle of approximately −69° with respect to the polarization direction of the input polarization selection element and a third birefringent element having a phase delay of approximately $2\Gamma$ and having a fast axis thereof oriented at an angle of approximately 83° with respect to the polarization direction of the input polarization selection element;
a third set of birefringent elements comprising a first birefringent element having a phase delay of $\Gamma$ and having a fast axis thereof oriented at an angle of approximately 135° with respect to the polarization direction of the input polarization selection element, a second birefringent element having a phase delay of approximately 2Γ and having a fast axis thereof oriented at an angle of approximately 69° with respect to the polarization direction of the input polarization selection element and a third birefringent element having a phase delay of approximately 2Γ and having a fast axis thereof oriented at an angle of approximately 97° with respect to the polarization direction of the input polarization selection element;

wherein the order of the birefringent elements, from the input polarization element to the output polarization element, is selected from the group of orders consisting of:

first birefringent element, second birefringent element and third birefringent element; and third birefringent element, second birefringent element and first birefringent element.

10. A method for forming a filter for filtering electromagnetic radiation, the method comprising:

providing an input polarization selection element;

providing an output polarization selection element;

providing a birefringent element assembly disposed intermediate the input polarization element and the output polarization element, the birefringent element assembly comprising one set of three birefringent elements, wherein the set of three birefringent elements has been selected according to the method comprising:

determining a first set of angular orientations of the three birefringent elements with respect to a polarization direction of the input polarization selection element so as to define a first set of three birefringent elements, the first set of angular orientations being represented by $\phi_1$, $\phi_2$, $\phi_3$, the first set of angular orientations being determined so as to provide a desired wavelength vs. transmission curve;

determining a second set of angular orientations of the three birefringent elements with respect to the polarization direction of the input polarization selection element so as to define a second set of three birefringent elements, the second set of angular orientations being $90°-\phi_1$, $90°-\phi_2$, $90°-\phi_3$;

determining a third set of angular orientations of the three birefringent elements with respect to the polarization direction of the input polarization selection element so as to define a third set of three birefringent elements, the third set of angular orientations being $90°+\phi_1$, $90°+\phi_2$, $90°+\phi_3$;

selecting a desired one of the first, second and third sets of three birefringent elements, wherein each of the first, second and third sets of three birefringent elements provide substantially the same wavelength vs. transmission curve and selection from among the three sets of three birefringent elements facilitates manufacturing flexibility;

selecting an order of the birefringent elements of the selected set thereof, the order being from the input polarization element to the output polarization element, the desired order being selected according to the method comprising:

selecting a order of first birefringent element, second birefringent element and third birefringent element;

selecting an order of third birefringent element, second birefringent element and first birefringent element; and wherein each of the orders provide substantially the same wavelength vs. transmission curve and wherein selection of the order facilitates manufacturing flexibility.

* * * * *